Dec. 9, 1969     G. PERRELLA     3,482,301
ZIPPER CHAIN MACHINE

Filed May 10, 1967     16 Sheets-Sheet 1

Inventor
Guido Perrella
By Cushman, Darby & Cushman
Attorneys

Dec. 9, 1969  G. PERRELLA  3,482,301
ZIPPER CHAIN MACHINE
Filed May 10, 1967  16 Sheets-Sheet 4

Inventor
Guido Perrella
By Cushman, Darby & Cushman
Attorneys

Dec. 9, 1969 G. PERRELLA 3,482,301
ZIPPER CHAIN MACHINE
Filed May 10, 1967 16 Sheets-Sheet 7

Dec. 9, 1969  G. PERRELLA  3,482,301
ZIPPER CHAIN MACHINE
Filed May 10, 1967  16 Sheets-Sheet 8

Inventor
Guido Perrella
By Cushman, Darby & Cushman
Attorneys

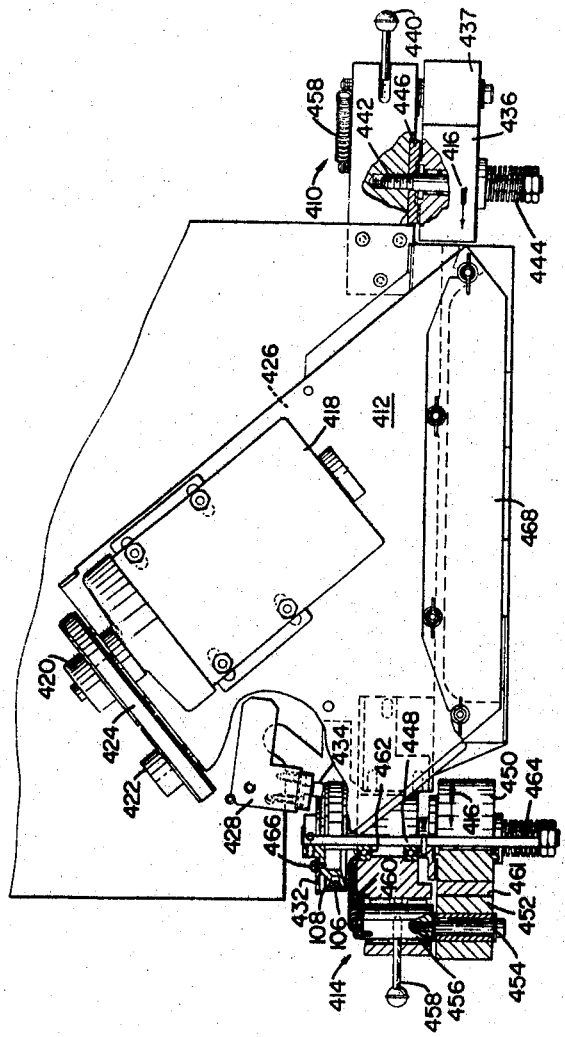

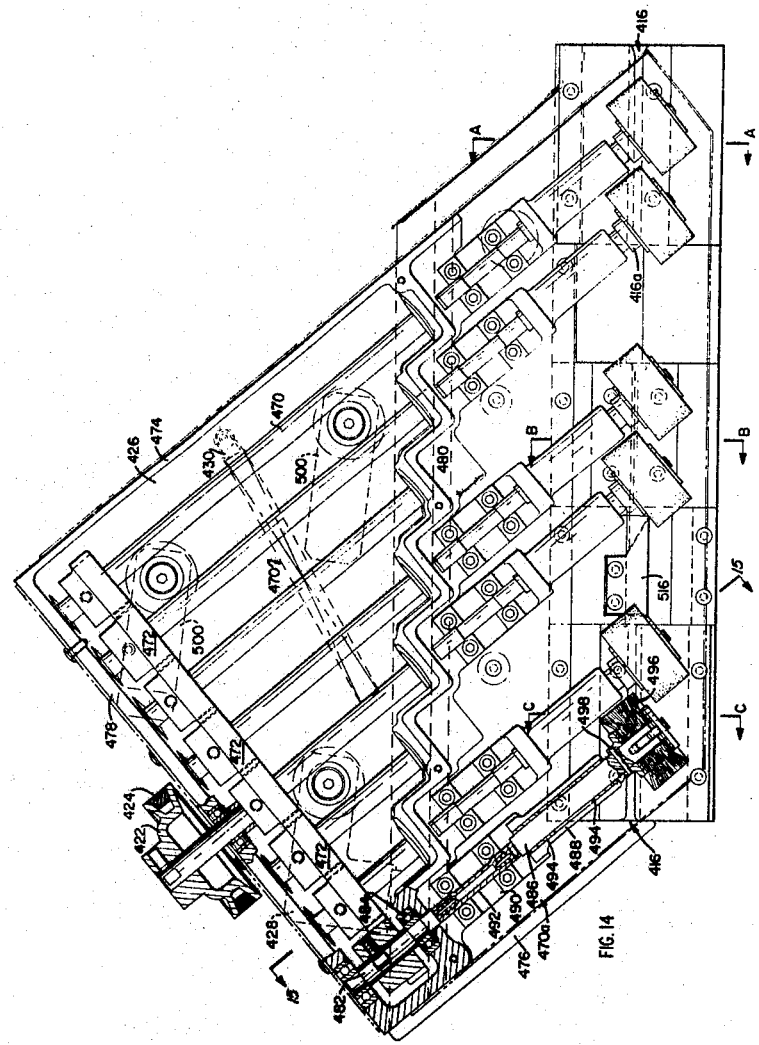

United States Patent Office 3,482,301
Patented Dec. 9, 1969

3,482,301
ZIPPER CHAIN MACHINE
Guido Perrella, Montreal, Quebec, Canada, assignor to Dynacast Limited, Montreal, Quebec, Canada
Filed May 10, 1967, Ser. No. 637,518
Claims priority, application Canada, June 14, 1966, 962,900
Int. Cl. A41h 37/06
U.S. Cl. 29—207.5                                                  7 Claims

ABSTRACT OF THE DISCLOSURE

A machine combining in one operation the forming of zipper chain from flat wire stock; the sizing of the zipper elements, and the brushing and polishing of the surfaces of the elements. The forming machine includes an interposing device for allowing the passing of zipper tape through the apparatus without having chain elements secured thereto. The sizing section crimps the working surfaces of the elements so that they are uniform in size and the brushing section sequentially rotates the zipper under contra-rotating brushes so that all the exposed surfaces receive a finishing.

---

This invention relates to machines for forming separable fasteners or zipper chains from flat wire and in particular to a machine which includes apparatus for performing all the operations necessary to provide a finished product, i.e. a formed, sized and polished zipper chain.

In Canadian Patent No. 661,442 of Apr. 6, 1963 there is provided a zipper machine that was substantially simplified in nature compared to those at that time known to the trade. Notwithstanding the fact that the fastener element of each zipper chain is extremely small in nature, the older forming machines were extremely large in size and relatively bulky with the result that substantial floor area was taken up in zipper making factories. The invention of the above-mentioned Canadian patent provided substantial improvement of such machines in producing a device that was quite small and extremely fast in production. The wire and tape feeds to the machine were automatic and the device produced a zipper chain in a high footage to time ratio. However, after the chain was made, i.e. the tape and elements were secured together, the chain had to be sized and brushed or polished in separate operations.

The present invention provides, in one aspect, a zipper chain making device that is a further improvement over that of the above-mentioned patent. Generally speaking, there are improvements to the tape pressure and drive systems so that tension thereon is obtained more simply and a better brake system is now incorporated that is much more effective than that of the above-mentioned patent. A further improvement is the means for gapping the elements on the tape whereby a production run of 6" zippers mixed with 9" or 12" zippers can easily and readily be accomplished.

A further improvement to the art in general is the bringing together in one apparatus all the mehanism necessary for a compete zipper operation. For example, the device presently to be described performs the following operations: (a) the first section receives tape and wire from supply sources and forms the zipper chain by punching the elements from the flat wire and applying them to the tape either in continuous or gapped or spaced operation; (b) the apparatus includes a device for automatically chamfering and sizing each element on the chain and for carrying out this operation either on continuous zipper or spaced zipper chain; (c) the apparatus includes means for brushing and cleaning or polishing each external face of the zipper after it leaves the chamfering section; (d) the apparatus provides means for winding the finished, polished zipper onto spools. The apparatus may be used as a complete zipper manufacturing centre or it can be broken up into its separate sections whereby an operator who is now provided a zipper making section need only acquire the chamfering and brushing mechanisms, etc., which are connectable one to another.

According to one aspect, therefore, the present invention relates to apparatus for manufacturing zipper chain comprising a device for receiving wire and tape therein and including means for forming chain elements from said wire and fastening the latter onto said tape; a pair of cooperating rotatable members adapted to receive said zipper chain therebetween for sizing and chamfering each element of said chain; means for brushing each exposed side surface of said chain elements; and means for spool winding the finished zipper chain for storage and shipping.

In accordance with a further aspect of the present invention there is provided a device for forming zipper chain comprising a frame; means for feeding wire and tape into said frame; a die set and ram guide mounted for cooperative operation in said frame; an eccentric driving shaft for actuating said ram with respect to said die; means interconnecting the driving shaft with the wire and tape feeding means to apply incremental movement thereto; and means for intermittently interrupting the application of wire onto said tape during continuous running of the latter.

The invention is illustrated, by way of example, in the accompanying drawings in which;

FIGURE 13 is a top or plan view of the brushing unit showing the drive motor and bell crank mechanism as well as the end pulley adjacent the winding spool apparatus as seen in side elevation in FIGURE 2;

FIGURE 14 is a further top view of the brushing mechanism shown in FIGURE 13 but with the motor and protective cover removed;

GENERAL ASSEMBLY

Figure 1:
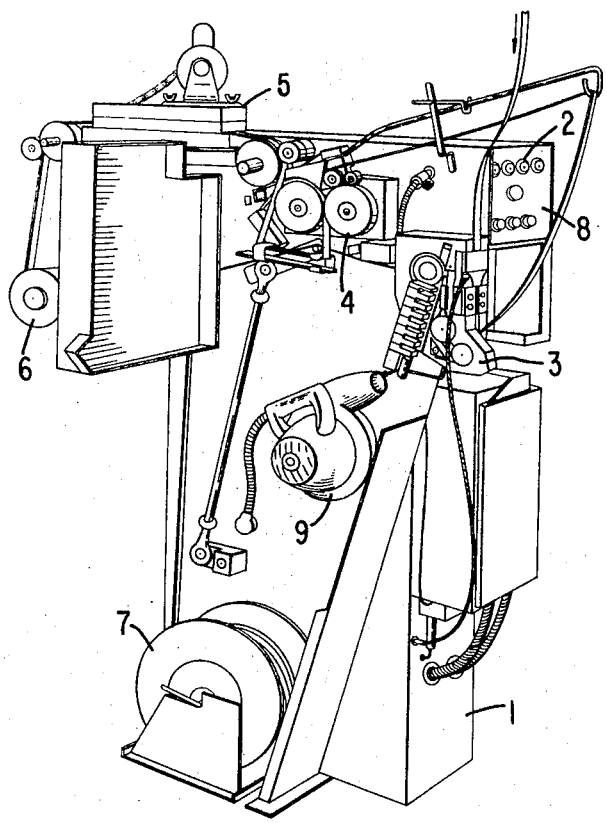
FIGURE 1 is a perspective view of the complete zipper forming apparatus.
Figure 2:
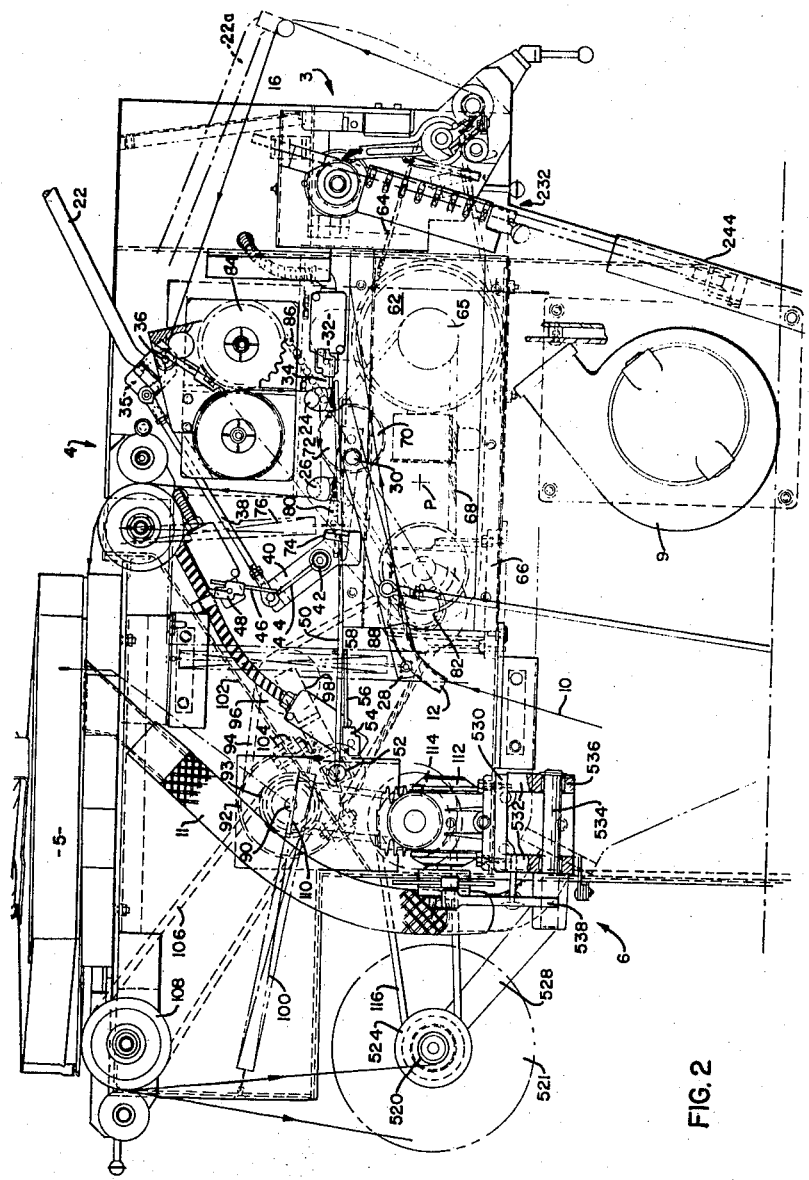
FIGURE 2 is a side elevation of the upper section of the apparatus shown in FIGURE 1 and illustrating in partial phantom line the drive mechanism for the various devices of the apparatus.

Referring to FIGURES 1 and 2 of the drawings, the apparatus comprises, in its integral unit, a cabinet 1 having a control panel 2, a zipper chain manufacturing device 3; a sizing and chamfering device 4; a brushing and polishing device 5 and spool winding mechanism 6. There is also included a supply roll 7 for the chain wire and a similar supply for tape can be provided adjacent the upper end of the device so that the tape may be led into the zipper chain making device 3 as shown. The cabinet 1 also includes a remote control panel 8 and a blower 9 for cooling the zipper making device 3 and for collecting dust from the brushing mechanism 5.

As previously mentioned, the brushing device 5, chamfering device 4 or zipper making device 3 can also be used independently of one another but in reference to FIGURES 1 and 2, they will be described as being interrelated to provide a full production unit.

Figure 7:
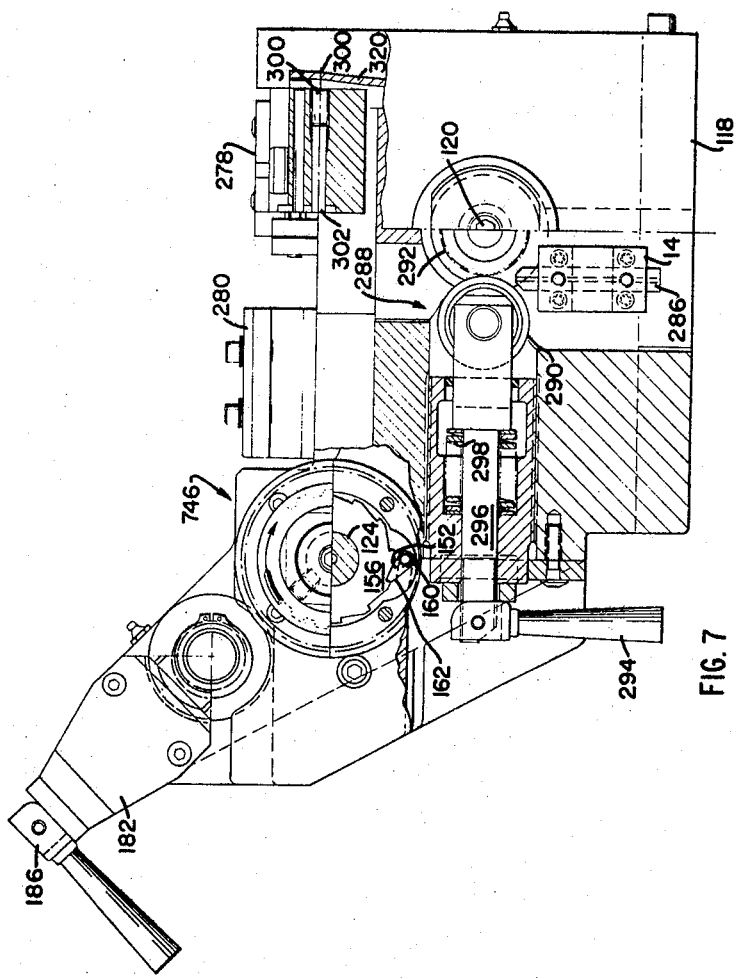
FIGURE 7 is a further side elevation of the zipper making device, partly sectioned to show the wire feed press and backward return mechanism.

The wire 10 is drawn from a supply source 7 upwardly through a guide tube 12 and into the zipper making device 3 by way of a wire guide assembly 14 (FIGURE 7). Simultaneously, a tape 16 is fed from a supply source (not shown) into the zipper making device 3 by way of a tape guide 18, shown in FIGURE 3. Device 3 punches the chain elements from the wire and applies them onto the bead of the tape and the tape leaves the device 3 through a tape pressure cartridge 20, shown in FIGURE 4.

The chain then progresses over a guide arm 22 into the confines of the sizing and chamfering device 4 and subsequently travels around guides 24 and 26 into the brushing device 5 and is finally wound onto the spool 6 as a finished product.

In view of the tension that may be applied to both the wire before it enters the chain making device 3 and also to the chain after it leaves the latter and progresses through the chamfering and brushing elements, means are provided to stop the machine at various stages if tension builds up to a dangerous level. It will be seen from FIGURE 2 that the wire guide tube 12 is secured to an arm 28 that is pivotally mounted to the apparatus cabinet at 30. The end of this arm, adjacent the pivot 30, terminates adjacent a limit switch 32 having an actuating arm 34. If, for example, the supply spool 7 for the wire should become locked or in any way encounter sufficient friction to resist the feeding draw of the device 3, tension will be applied to the wire 10 as it passes through its guide tube 12 and, in so doing, will draw the arm 28 downwardly until such time as the upper end of the arm 28 throws the actuating arm 34 of the limit switch 32 to shut off the machine. Spring 13 applies necessary tension to tube 12 as shown.

Arm 22 is connected to a block 35 pivotally mounted at 36. Also connected to the block 35 is one end of a rod 38 which is pivotally connected at its other end to an arm 40, which in turn is pivotally mounted to the cabinet as at 42. Arm 40 is slotted as at 44 to receive one end of an actuating arm 46 on a limit switch 48. It will be appreciated that, if the tension on the chain leaving the machine 3 reaches such a degree that the arm 22 is bent downwardly beyond the position shown at 22a in phantom line, the arm 38 and arm 40 will be pivoted to such a degree that the limit switch 48 will be actuated by its arm 46 and the machine will be stopped. Limit switch 48 and the arms 38 and 22 deal with the tension applied to the chain between the chain making apparatus 3 and the chamfering device 4.

A still further limit switch mechanism is provided between the chamfering device 4 and the brushing mechanism 5. It will be seen that chain guides 24 and 26 below the chamfering mechanism 4 are mounted on a horizontally disposed rod 50 which is mounted for pivotal movement at 52. A limit switch 54 is provided with an actuator 56 having an arm 58 which is adapted to be engaged by the horizontal rod 50. If tension on the chain between the chamfering section 4 and brushing section 5 increases or decreases beyond desired or acceptable degrees, the tension or lack thereof will be transferred to the horizontal arm 50 by way of the guides 24 and 26 which in turn will actuate the limit switch 54 through the actuator 56 to stop the machine.

The above described arms are not only responsive to tension in the wire and zipper supporting roles in which they shut off the apparatus by limit switches but these arms are interconnected with the drive mechanism of the complete apparatus so as to alter the drive ratio between one unit and another to take up or compensate for slack or tension between these units. The drive means for the apparatus comprises an electric motor 62 as shown in FIGURE 2. This motor drives the main shaft of the zipper making machine 3 by means of a timing belt 64. It will be noted that this drive is constant. Additionally, motor 62 is interconnected with and drives a gear box 66 by means of a variable ratio belt 68 and an idler pulley 70.

Idler pulley 70 is rotatably mounted on the terminal end of an extension bar 72 secured by bolts 74 to one end of the arm 40 just beyond the pivot point 42 of that arm. It will appear evident from FIGURE 2 that idler pulley 70 maintains the variable ratio belt 68 in proper tension between the pulley 65 on motor 62 and the corresponding pulley on gear box 66. Furthermore, this tension is maintained by spring means 76 connected to the upper end of the cabinet at one of its ends and, at its other end, to one of a number of holes 80 in the bar 72.

Gear box 66 has two output pulleys, pulley 82 (as shown in the form of a sprocket) which rotates a driven sprocket 84 of the chamfering and sizing mechanism via a roller chain 86; and a second pulley 88 which rotates a lay shaft 90 by means of a pulley 92 thereon by way of a second variable ratio belt 94 and an associated tensioning idler pulley 96. In similarity to the idler pulley 70 and its association with arm 40, idler pulley 96 is mounted for rotation on an extension bar 98 secured to and extending from the inner end of the pivot mounting rod 52. Spring means 100 applies desired tension onto the belt 94 by its connection at one end between the cabinet and, at its other end, with the bar 98, as shown. The pivot mount 52 and the lay shaft 90 are secured to a plate member 102 by means of bearing caps 104.

A pulley 93, by means of a further variable ratio belt 106, drives a draw pulley 108 of the brushing mechanism 5, specifically that pulley at the outer or finished end of that mechanism. Also mounted on the lay shaft 90 is a third pulley 110 which serves to drive a gear box 112 through a further pulley 114. As shown in FIGURE 2, gear box 112 is the drive mechanism for the wind-up spool 6 and rotation of the latter is carried out through a spring belt 116.

The above described variable ratio drive together with their tensioning arms are provided to take up or let out any slack in the wire or zipper chain whilst it is traveling between the chain making device 3, chamfering section 4, brushing section 5, or winding section 6. For example, if, for some reason, the chain C after leaving the chain making device 3 applies a sufficient tension to the arm 22 to pull it downwardly towards the position 22a so that the arm 40 pivots about its point 42, as previously described, the extension 72 of this arm will also be pivoted downwardly toward position P and in so doing will apply a specified amount of slack to the belt 68 which, in turn, will alter the gear ratio of gear box 66 and the revolutions per minute of its pulley or sprocket 82 thereby, through the chain 86, slowing the sprocket 84 of the chamfering section 4. This prevents breakage of the zipper chain and the chamfering section 4 will be in concert with the making machine 3 insofar as speed is concerned. Of course, if the tension is great enough, the limit switch 48 will be thrown and the machine will be stopped. Likewise, any change to the ratio of gear box 66 by the variable ratio belt 68 through the action of the pivotal idler pulley 70 will also be applied to the draw pulley 108 of the brushing mechanism through the intermediary of the pulley 88, belt 94, idler pulley 96, lay shaft pulley 92 and belt 106. This is also carried one step further in changing the ratio of the lay shaft 90 and the gear box 112 driving the winding sprocket or spool 6. In effect, any change in the tension at the forward end of the machine will be compensated for throughout the complete drive mechanism when that tension is effected by the chain between the making machine 3 and the chamfering section 4.

Similar control or ratio change is also applicable between the chamfering section 4 and the brushing section 5 by means of the swinging or pivoting action of extension arm 98 changing the ratio of belt 94 through pivotal movement of the pulley 96, arm 98 being originally swung through movement of the horizontal arm 50 in response to tension on the guides 24 and 26 by chain leaving the chamfering section 4. Here again, if the tension is sufficiently strong enough, the limit switch 54 will be thrown and the machine will be stopped.

The zipper making device 3 is designated for extremely high speed (in the region of 6,000 r.p.m.) and in order to maintain the mechanism as cool as possible, a blower 9 conveys cool air onto the under side of the machine 3 which is ribbed (not shown) to take advantage of the best means of conveying this cooling air to the interior of the device.

It will also be noted from FIGURE 1 that a vacuum system is connected to the brushing assembly 5 and consists of a hose 11 which extends from the brushing assembly down into the cabinet where it is connected to suitable receiving means which will be explained further in this disclosure. The vacuum system removes all the cuttings and fine particles from the area of the brushes and deposits them into a storing receptacle.

CHAIN MAKING MACHINE

Figure 3:
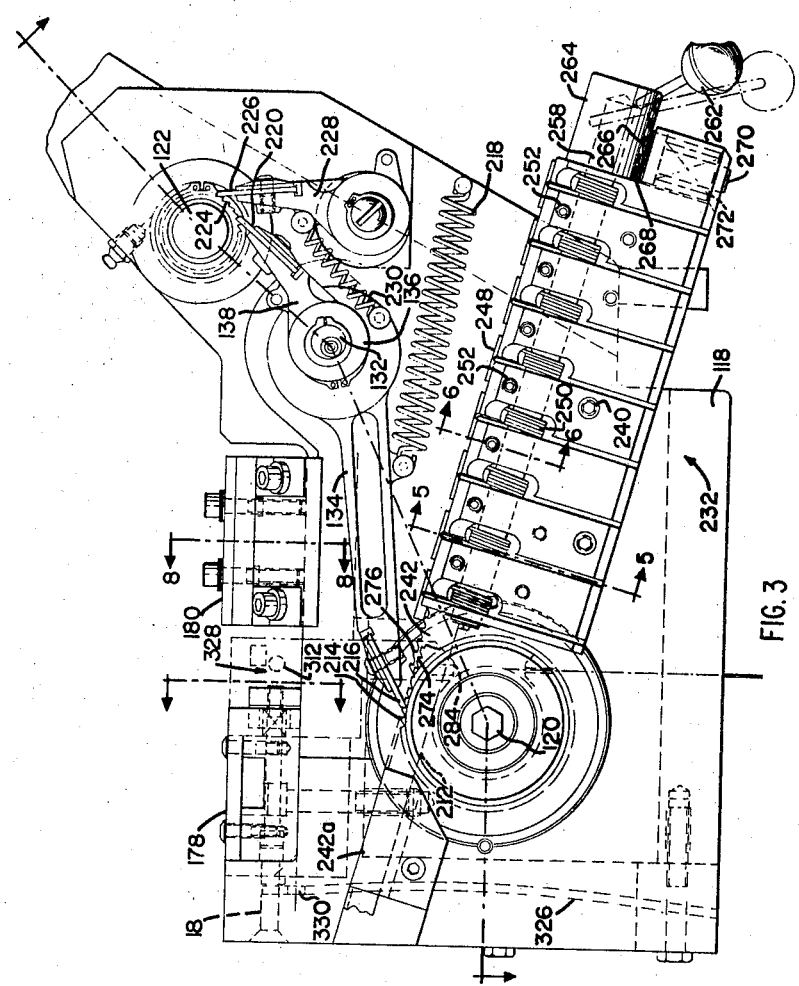
FIGURE 3 is a side elevation view of the zipper chain making device shown in FIGURE 2.
Figure 4:
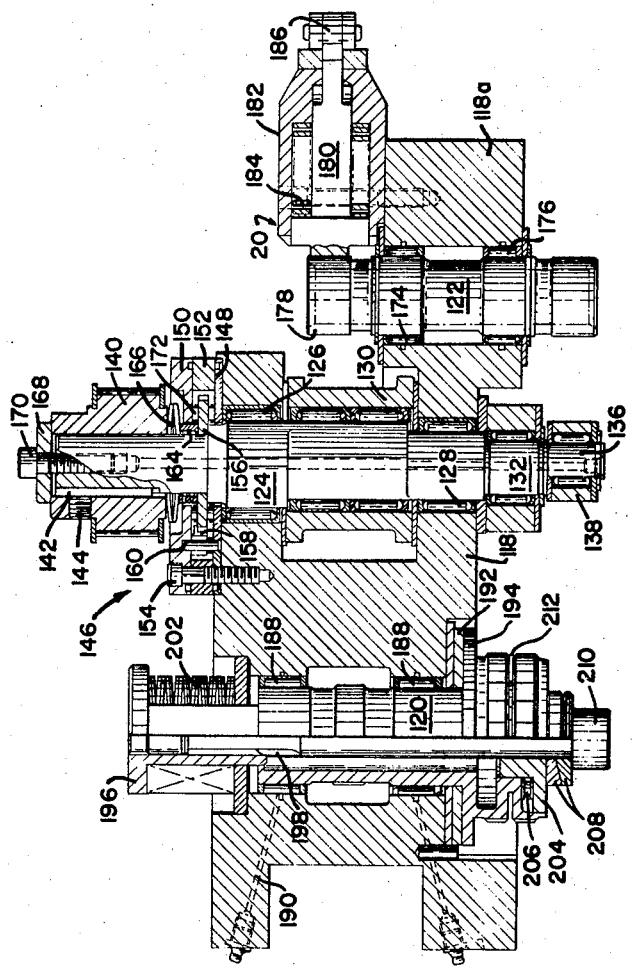
FIGURE 4 is a sectional view taken along the lines 4—4 of FIGURE 3.

The device for forming the zipper chain from the tape and the wire 10 is shown in detail in FIGURES 3, 4 and 7. Referring firstly to FIGURE 3 and FIGURE 4, the device 3 includes a body 118 which carries three main shafts; a wire feed shaft 120 for drawing the wire 10 from its source of supply into the device; a tape feed shaft 122 for drawing the tape from its supply source into the device 3; and the main drive shaft 124 that is driven by the motor 62 and belt 64 (FIGURE 2) and which, in turn, drives the wire feed shaft 120 and tape feed shaft 122 and which also actuates the die members as will subsequently be described.

The main drive shaft 124 includes three eccentrics for actuating the other shafts and the die mechanism. As shown in FIGURE 4, shaft 124 is cradled in the body 118 by means of roller bearing mountings 126 and 128. Intermediate these roller bearing mountings is the sleeve 130 which, as will later be described, actuates the die mechanism. On the outer end of the shaft 124 a further eccentric 132 drives a wire feed pawl 134 and a third eccentric 136 drives a tape feed pawl 138.

The main or eccentric shaft 124 receives its drive from belt 64 by means of a pulley 140 secured to one end of the shaft 124 with a key 142 and set screw 144. It will be seen from FIGURE 4 and FIGURE 7 that back lash or rearward turning of the shaft 124 is effectively prevented by a brake system generally indicated at 146. A running plate 148 and a thrust cover 150 are concentrically mounted on the shaft 124 and are separated by spacer 152 and are secured to the body 118 by cap screws 154. Also concentrically mounted on the shaft 124 is a ratchet wheel 156 (FIG. 7) which is prevented from turning in a reverse direction by a pawl 158 secured to the body by a dowel pin 160 and maintained in engagement with the teeth of the ratchet wheel by a spring 162.

Ratchet wheel 156 is adapted to rotate with the pulley 140 and shaft 124 and, to this end, it is frictionally engaged by the pulley 140 through the intermediary of a friction spacer 164 and a pair of Belleville springs 166. Pressure on the plate or ratchet wheel 156 is applied through the Belleville washers 166 by means of a collar clamp 168 and a cap screw 170 which applies an axial pressure on the shaft 124 when it is tightened down. In order for the ratchet wheel 156 to remain free running, it is mounted for rotation between the running plate 148 and thrust cover 150 by means of roller bearings 172 as shown in FIGURE 4. The above described brake system provides a substantial improvement over that of the previous Patent 661,442 as may be seen from a review of FIGURE 7 of that patent.

Another improvement of Patent 661,442 that is worthy of note is the type of tape feed or drive. In the present proposal, it will be seen that the tape drive is external of the body 118, specifically on an extension of the body 118a. In the above mentioned patent, the tape drive was internal of the frame machine which made it extremely difficult to apply regular maintenance or break-down service. Moreover, the means of applying pressure to the tape in Patent 661,442 (FIGURE 5) was complicated and expensive, for example in that the arm 73 pivoted about a shaft 74 in response to pressure applied on the other end of the arm 73.

Referring again to FIGURE 4, the tape feed shaft 122 is mounted for rotation in the body extension 118a by roller bearings 174 and 176. The inner or passage ends of shaft 122 is knurled at 178 to apply a drawing pressure onto the tape T, as shown, and pressure is applied to the tape T by means of a pressure cartridge 180 mounted in a housing 182 and surrounded by a coil spring 184. The outer end of the cartridge 180 is connected to a cammed handle 186 whereby tension can be applied or relieved. This cartridge structure is shown in side view in FIGURE 7.

The wire feed shaft 120 is mounted for rotation in the body 118 by roller bearings 188 which may be lubricated from nipples 190 as shown in FIGURE 4. A desired torque resistance must also be built into the wire feed shaft to prevent a rotation faster than is required. Therefore, the shaft 120 is provided with a two-plate clutch 192 mounted between a flange 194 of the casting of the main shaft and the body 118. Pressure on the clutch is effected by the other end of the shaft 120 and specifically by a pressure nut 196 which is threadably attached to the shaft 120 as at 198. The shoulder of the pressure nut 196 has an opposing surface in a pressure washer 200 that is positioned in a countersunk region of the body 118 and intermediate the surfaces of the washer 200 and the shoulder 196 are a plurality of pressurized Belleville washers 202. It will be appreciated that adjustment of the pressure nut 196 will draw the shaft inwardly by applying pressure through the Belleville washers and therefore increasing the amount of torque necessary to rotate the shaft 120. This pressure is transferred to the outer end or driven end of the shaft 120 by means of a pressure plug 204 which acts against bearings 206 through spherical washers 208 secured in place by a cap screw 210. It will be noted that the driven end of shaft 120 is formed with a circumferential groove 212, the purpose of which will be subsequently described.

Turning now to FIGURE 3, it will be seen that the drive end of the wire feed shaft 120 which includes the circumferential slot 212, is also provided with a plurality of teeth 214 whereby this shaft may be incrementally rotated through the reciprocal action of a driving blade 216 on one end of the wire feed pawl 134 that is driven by the eccentric 132 on the drive shaft 124. As previously mentioned, this driving force of the pawl 134 must overcome the tension applied to the shaft 120 by the Belleville springs 202 as well as by further spring means 218 as shown.

The tape feed pawl 138 that is driven by eccentric 136 is also provided with a blade 220 for incrementally rotating the tape feed shaft 122 by means of teeth 224 circumferentially placed on the protruding end thereof. Back lash or reversal of the shaft 122 is prevented by the blade 226 of a back feed pawl 228 mounted on the body 118a. Pawl 228 and pawl 134 are interconnected by spring means 230.

The zipper chain may be manufactured in one continuous length or it may be desirable to manufacture the chain in lengths of say 6 inches with a 2 or 3 inch gap between each chain. The tape, of course, would remain continuous. The present apparatus provides a gapping mechanism indicated generally at 232 in FIGURE 3 and shown generally in FIGURE 1 and in sectional detail in FIGURES 5 and 6 The gapping device comprises front and rear body portions 234 and 236, respectively, secured together by cap screws 238 and this unified body is then secured to the body 118 of the zipper making machine 3 by means of further cap screws 240.

Figure 5:
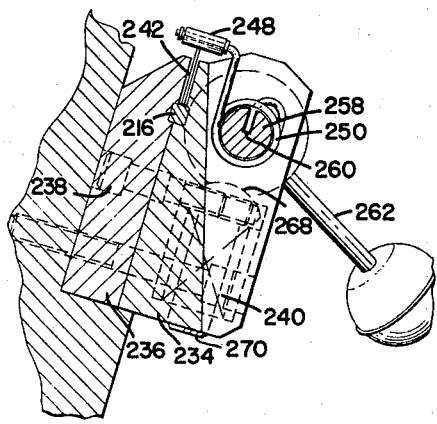
FIGURE 5 is a sectional view of the gapping device taken along the lines 5—5 of FIGURE 3.
Figure 6:
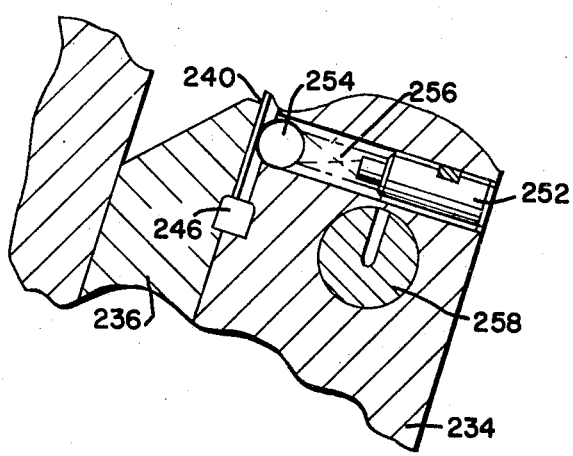
FIGURE 6 is a section along lines 6—6 of FIGURE 3.

Briefly, the gapping device carries a blade member 242 which cooperates with and rides in the slot 212 of the wire feed shaft 120. As shown in FIGURE 2, the blade 242 is wound upon a spool 244 from whence it is fed into the gapping device 232. As shown in FIGURE 5, the blade rides intermediate the front and rear bodies 234, 236 of the gapping device and rides on a key 246 extending the length of the guide. The blade is maintained in engagement with the key by a plurality of fingers 248 spaced throughout the length of the guide and these fingers are resiliently mounted on the ends of coil springs 250, as shown. Moreover, it will be seen from FIGURE 6 that a plurality of set screws 252 disposed intermediate each spring and finger 248 serves to press a ball member 254 against the side of the blade by means of a spring 256. The guide 232 is provided with a shaft 258 for operating the fingers 248 and this is accomplished by the inner ends of each spring 250 being disposed in slots 260 in the shaft as shown in FIGURE 5. The outer terminal end of the shaft 258 is provided with a handle 262 connected to a collar 264 and the lower end of the collar is provided with a recess 266 adapted to receive therein the head 268 of a bolt 270, the bolt being resiliently pressed into engagement with the collar by means of a coil spring 272.

It will be apparent that, by swinging the handle 262 in an arc, the shaft 258, springs 250 and fingers 248 will be rotated so as to free the blade 242.

It will be seen from FIGURE 3 that the blade 242 is provided with a low or normal elevation or height 274 and a raised portion 276. It will also be noted that the normal portion 274 corresponds in its height with the depth of the slot 212 in the wire feed 120 so that, during reciprocal action of the wire feed pawl 134 and the blade 216 thereof, the guide will be moved along one notch or tooth as is the notches on the driven end of the feed shaft 120. However, if a spacing is required between the chain elements of the zipper, for example, 6" zippers, then a raised portion 276 will be inserted in the blade at 6" intervals and the length of the raised portion 276 will correspond with the distance between one zipper and the next, say 2" or 3". As this portion 276 is engaged by the blade 216 of the pawl 234, blade 216 is then raised from engagement with the teeth 214 on the wire feed shaft. This therefore prevents rotation of the latter and wire is no longer fed into the device although the tape feed is constant through the action of the pawl 138 and its blade on the tape feed shaft 122. After the raised portion 276 of the blade is fed through the guide and the guide outlet 242a, and the height of the blade returns to the normal portion 274, then the blade 216 will again engage the teeth 214 to institute further rotation of the wire feed shaft 120.

TOOL AND DIE SET

Figure 9:
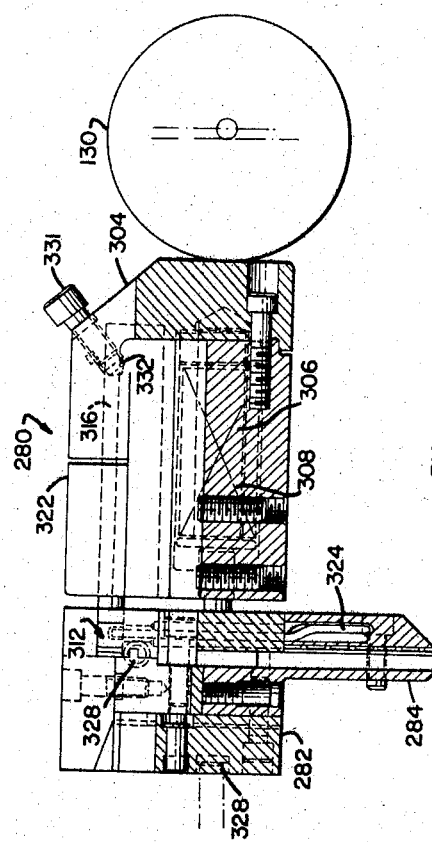
FIGURE 9 is a sectional view of the die set assembly.

In FIGURE 3, it will be seen that the body 118 of the chain making machine has secured to its upper surface a tool seat 178 and a die set clamp 280. The die set assembly is shown in detail in FIGURE 9 in section and in FIGURE 10 in plan view while the tool set may be seen in section in FIGURE 7 of the drawings. As shown in FIGURE 9, the die block 282 includes a bridge member 284 which extends downwardly into the confines of the device 3 as shown in pecked line in FIGURE 3. This constitutes the inlet into the die block 282 of the chain wire which enters via a chain wire guide 286 shown in FIGURE 7. At this point, it is controlled by a wire feed press 288 which in construction, is not unlike the tape pressure cartridge 180 shown in FIGURE 5. The feed press 288 includes a pressurized wheel 290 cooperating with a knurled wheel 292. Tension may be applied or released through handle 294 which is cammed onto one end of a shaft 296 resiliently mounted by spring 298.

The tool seat assembly 178 includes an opening 300 by means of which a male tool may receive adjustment from a pin 302. The latter cooperates with a female punch positioned in the die set. The latter device is mounted together with a punch housing 304 which is adapted to slide in the die set guide 280 shown in FIGURE 3. It will be noted in FIGURES 9 and 10 that one end of the punch housing 304 is engaged by the main eccentric 130 on the drive shaft 124. Reciprocal action of the tool housing 304 is effected by the eccentric 130 and the housing is returned and kept into engagement with the eccentric through a pair of rods 306 and their associated springs 308.

Figure 10:
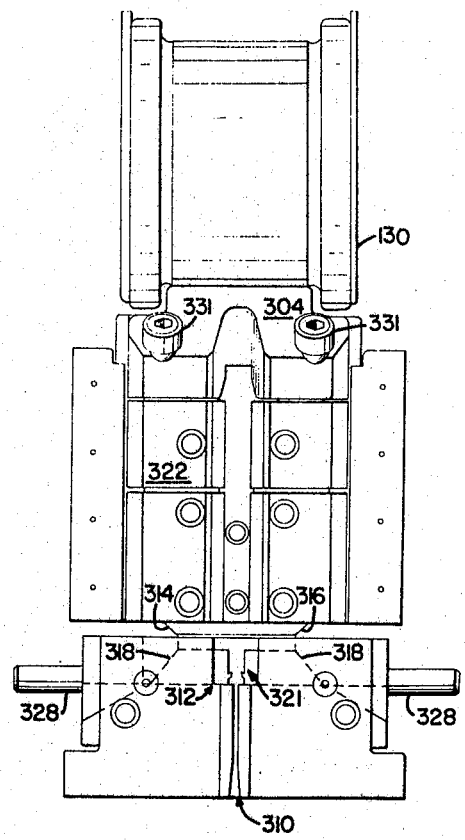
FIGURE 10 is a top elevation view of the die assembly shown in FIGURE 9.

Turning now to FIGURE 10, it will be seen that the tape which is drawn into the machine via a passageway 310 receives an element of the chain punched from the wire in the die set. This is effected at location 312 shown in FIGURE 3. The apparatus of FIGURE 10 includes left and right cams 314 and 316 which have sloped ends 318. These sloped ends act on mating surfaces of left and right hand jaws. The cams are held in position by suitable cam clamps 322 and, as the punch housing 304 is reciprocated backwards and forwards, the sloped surfaces 318 and 320 cause the jaws 321 to move inwardly and outwardly thereby clamping the chain element onto the tape. When the tool housing 304 is reversed through the action of the springs and rods 308 and 306, the left and right hand jaws of the surfaces 320 are re-opened through the work of a U-shaped spring 324 shown in FIGURE 9.

As will be seen from FIGURES 3 and 7, a flat, long leaf type spring 326 serves to return the knock-out in the die shoe (FIGURE 7) and, as previously mentioned, this spring includes an aperture 330 through which the male member of the punch may be adjusted by pin 302. This is best shown in FIGURE 7. It will also be noted from FIGURE 10 that a pair of vacuum tubes 328 cooperate with the jaw members to draw away the chips formed when the element is punched from the wire and clamped onto the tape bead. The relative position of the vacuum tube 328 is coaxial. Moreover, FIGURES 9 and 10 show the means of adjusting the cam members 314 and 316 which comprises a pair of set screws 331 that bear on sloped cooperating surfaces 332 of the outer end of the cam members 314 and 316. This provides easy access to the cams and their longitudinal adjustment in the die set.

Figure 8:
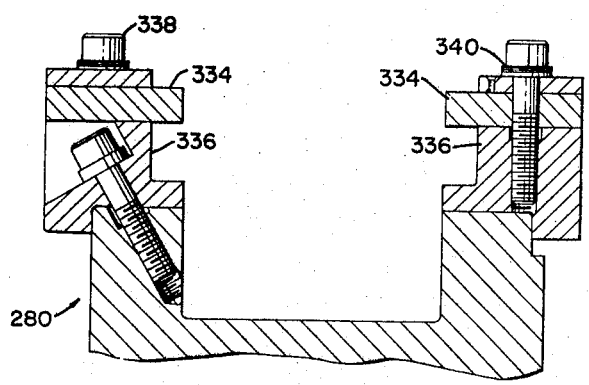
FIGURE 8 is a sectional view along lines 8—8 of FIGURE 3.

As shown in FIGURE 8, the die guide of FIGURE 3 comprises a pair of plate members 334 mounted on guides 336 and held in position by cap screws 338 and Belleville washers 340. It will be appreciated that easy removal of the die block is effected by unscrewing the set screws 338 to loosen the clamps and collar plates 334 whereby the latter may be lifted away and the die set can be removed from the body 118. This provides a substantial improvement over the older system where the complete die block had to be dismantled.

SIZING AND CHAMFERING UNIT

As shown in FIGURE 1, the sizing and chamfering unit is disposed intermediate the chain making device 3 and the brushing section 5. It works the surfaces of the chain elements of the zipper to ensure a uniform thickness thereof and also to chamfer the exposed surfaces of these elements so as to remove some of the rougher edges before the chain enters the brushing section.

Figure 11:
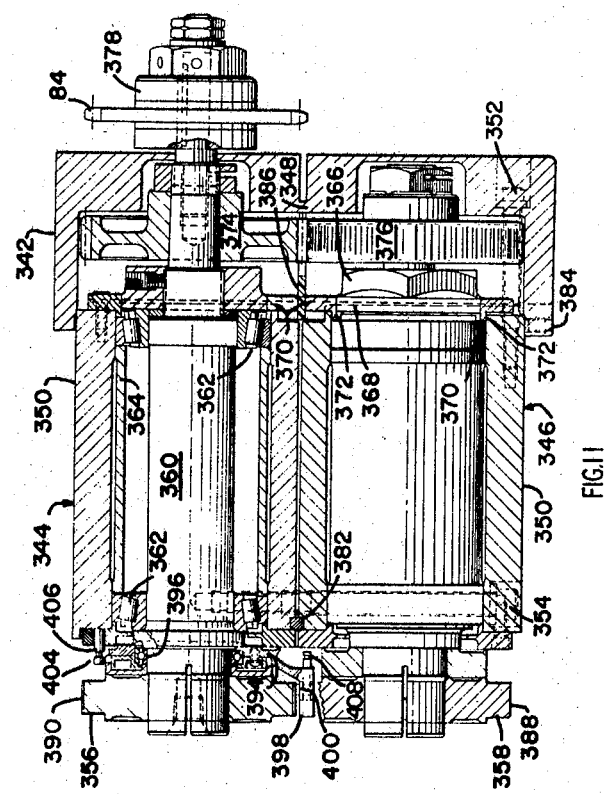
FIGURE 11 is a cross-sectional view of the sizing and chamfering unit shown in FIGURE 2.

As shown in FIGURE 11, the chamfering device 4 comprises a body 342 having a driving section 344 and a driven section 346. It will be noted that these two sections are connected together by a relatively thin portion of the body at 348 for a purpose subsequently to be described. Each section of the body 342 receives a housing 350 and these housings are retained, for example, by cap screws 352 at the one end and are interconnected together by other cap screws 354 at the operative end.

Sections 344 and 346 rotatively mount sizing and chamfering wheels 356 and 358 respectively. Each wheel, for example 356, is mounted on a shaft 360 which, in turn, is mounted for rotation in bearings 362 in a sleeve 364 mounted in each housing. The inner end of each shaft 360 is provided with a special nut 366 having a circular rotatable portion 368. A flange 370 clamps the outer race of the bearing, each flange being secured to the adjacent face of the respective housing 350 and 352. Each flange has an annular ring 372.

Shaft 360 is provided with a driving gear 374 that meshes with and rotates a driven gear 376 as shown. Gear 374 is rotated through an overload clutch 378 by means of the sprocket 84 that is rotated by the chain shown in FIGURE 1.

Figure 12:
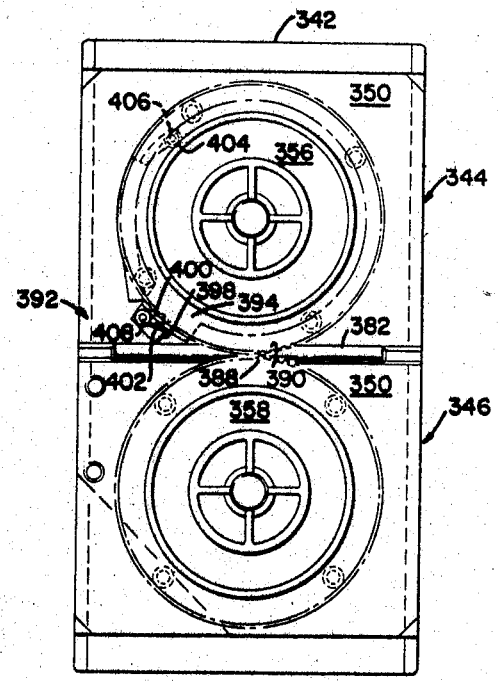
FIGURE 12 is an end elevation of the chamfering unit shown in FIGURE 11.

It will be noted that the outer ends of the housings 350 are separated by a key 382 (FIGURE 12). This key can be replaced by one of greater size or the key, as shown, can be ground down so as to bring the chamfering and sizing wheels 356, 358 closer together. This action is made possible through the flexibility of the body 342 of the device by way of the resilience in between the sections 344 and 346 by means of the thin interconnecting portion 348. The key can be ground away and the housings can be retightened by means of the cap screw 354. In addition, if there is any back lash or play that has developed between the gears 374 and 376, this may be compensated for by grinding and by subsequently bringing those ends of the housings 350 closer together with a further set screw 384 as shown in FIGURE 11. The space intermediate the aligned edges of the flanges 350 is taken up by a felt 386.

Each wheel 356 and 358 is provided with a series of circumferentially spaced grooves 388 providing therebetween each groove a raised portion 390. During the sizing and chamfering operation, the grooves 388 receive the elements of the zipper chain while the raised portions 390 fall intermediate the elements of the chain. As previously mentioned, through the provision of the key 382, as shown in FIGURE 12, the size or thickness of the chain can be compensated for as can the distance between the elements by replacing wheels 356, 358 with those having either a greater or smaller number of grooves on its circumferential surface.

When running spaced zipper chain, that is chain that has the elements spaced apart in, for example, 6″ or 9″ sections through the provision of the guide blade shown in FIGURE 3, there is a danger that when the spaced sections reach the chamfering members, the elements would not always fall in their proper position with respect to the peaks and grooves of the chamfering wheels. In other words, after one section of the chain is run through, there might be a space of say 2″ to 3″, then the next element of the next section would enter the space between the wheels 356 and 358. However, the position of the first element on this section might not coincide properly with the grooves 388 of the wheels 356, 358 and at least the first element of the section could be ruined before its proper position would be found by the natural positioning of the chain.

In order to prevent this misalignment and to ensure that the elements always are properly engaged, the chamfering member includes an aligner generally indicated at 392 in FIGURE 12. This aligner, as shown in FIGURE 11, comprises a circumferential member 394 mounted for rotation on the shaft 360 by means of a bearing 396.

The aligner supports a pawl hanger 398 which, in turn, includes a pawl 400 having a spring 402 which ensures the engagement of the pawl with the grooves 388 of its wheel 356. The aligner 394 is resiliently mounted for rotation about the shaft 360 by means of a spring 404 connected at one end to a hanger 406 and, at the other end, to a pin 408.

When a piece of chain tape without elements is running through the chamfering device 4, the pawl and hanger will be in the position shown in FIGURE 12. However, as the next section of chain arrives, the first element thereof will catch on the hanger 398 and, due to the fact that the pawl 400 is engaging the groove 388, will pull member 394 around so that the first element will automatically engage a proper groove and peak 388 and 390. The pawl hanger will remain in an advanced position with the pawl 400 being slipped over the grooves and peaks of the wheel 356 until such time as another space enters the area between the chamfering wheels whereby the pawl hanger will be released and the spring 404 will return the pawl and its hanger to the position shown in FIGURE 12.

BRUSHING ASSEMBLY

Figure 14A:
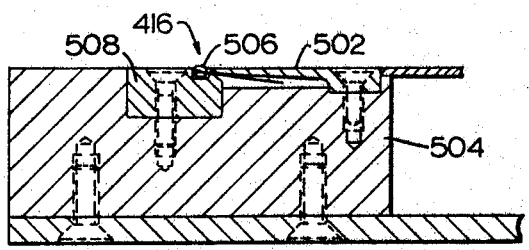
FIGURES 14a, 14b and 14c are sections along lines a—a, b—b, and c—c of FIGURE 14.
Figure 14B:
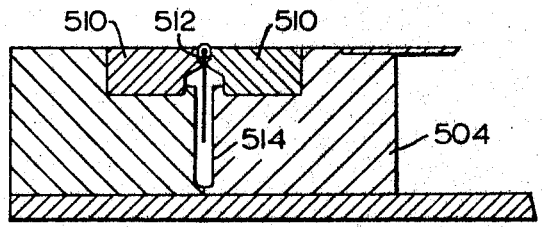
Figure 14C:
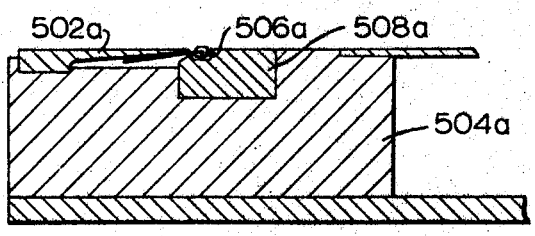
Figure 15:
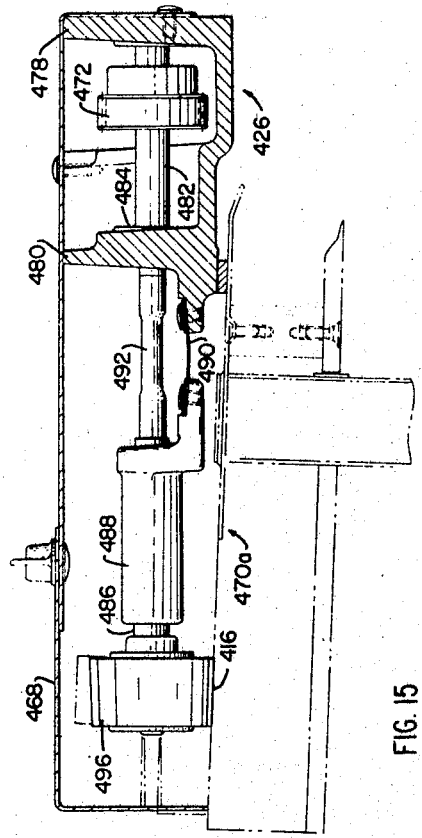
FIGURE 15 is a section taken along the lines 15—15 of FIGURE 14 and disclosing the structural features of one of the brushing units.

The brushing assembly is shown in FIGURES 13 through 15 of the drawings. The brushing assembly 5 includes a tension pulley 410, the main brush housing 412 and a driven pulley 414 at the exit end of the housing. The path of the zipper chain through the housing is indicated by the arrows 416 at the end thereof. Housing 412 encloses a plurality of brushes driven by a motor 418 through pulleys 420 and 422, the latter being driven by the former by a belt 424. The brushes are mounted in a drive box 426 that is oscillated continually by a bell crank 428 and spring 430 by means of a cam 432 mounted on the pulley 108. As shown in FIGURE 13, the rotation of cam 432 effects oscillation of one arm of the bell crank 428 through a follower 434.

Tension pulley 410 comprises a pair of vulcanized rubber rollers 436, 437 through which the chain passes as indicated by the arrows 416. The tension on the chain is maintained through a spring 438 which may be released through the action of a handle 440 actuating on an eccentric shaft (not shown). Tension is also applied to the larger of the two rollers 436 by means of a shaft 442 having a tension spring 444 thereon that applies pressure to a clutch plate 446. This prevents the chain from being drawn too fast through the brushing section between the puller 410 and the driven puller 414. The driven puller 414 has a centre shaft 448 on which is concentrically mounted a rubber roller 450 that is in contact with a similar roller 452 mounted on a sleeve shaft 454. The latter shaft is secured to an eccentric shaft 456 which is provided with a handle 458. By turning the handle downward against the tension of a spring 460, the nip 461 of the rolls 450 and 452 will be opened.

Shaft 448 is mounted for rotation in bearings 462 and at one end is provided with a thrust spring 464 and at the other end with the pulley 108, shown and described in FIGURE 1. Cam member 432 is secured to pulley 108 such as by rivets 466.

The path taken by the chain through the brushing assembly is enclosed by a removable cover 468.

FIGURE 14 shows the brushing assembly with the cover removed and it will be seen that the plurality of brushing members indicated generally at 470 are rotated through pulley 422 by means of gears 472, each gear being mounted on the shaft of each brush member 470. By virtue of the interengagement of each gear with the adjacent gear, each brush rotates in a counter movement with relation to the adjacent brush. The drive box 426 comprises side walls 474 and 476 as well as an end or back wall 478 and a front wall 480, all these walls being joined together by integrally cast corners.

It will be noted that the brushing members 470 are mounted for rotation at an angle with respect to the path 416 of the zipper chain. Accordingly, each brush is longer than the adjacent brush and the front wall 480 of the box 426 assumes a zig-zag pattern throughout its extent.

Each brush is substantially identical with the next and FIGURE 15 is a side sectional view of the second brush from the left of the drawing taken along the lines 15—15 of FIGURE 14.

Referring firstly to FIGURE 14, each brush member such as 470a is divided into two main sections, that lying within the confines of the walls of the box and the other section being outside the confines of the box in the area which is designated as the cleaning area.

Brush 470a consists of a first shaft 482 mounted in the walls 478 and 480 by means of bearings 484. The brushing member 470a is also provided with an outer shaft 486 mounted in a housing 488, this housing being interconnected to the wall 480 of the drive box by a resilient spring blade 490 and it will be noted from FIGURE 15 that the spring blade is bent to provide a downward pressure of the brushing member onto the path 416 of the zipper chain. Shafts 482 and 486 are provided on their opposing aligned ends with shoulder grips to receive a rubber coupling 492. Outer shaft 486 is mounted in sleeve bearings 494 and the terminal end of the shaft is provided with a wire brush 496 secured thereto by a pin 498.

It will be appreciated that, due to the provision of the spring blade 490 and the resilient rubber coupling 492, the brushes 496 of the assembly 470 resiliently and flexibly engage the surfaces of the zipper chain as it passes through the mechanism. Furthermore, this particular type of mounting provides easy removal of the brushes for maintenance.

The floor or plate of the drive box 426 is also provided with two other pivotal connections 500 which, in company with the bell crank 428, allow the pivotal movement of the complete brushing unit. This ensures that the chain receives an even brushing and that the brushes 496 themselves receive even wear across their faces. In addition, the drive motor 418 is supplied with a control means (not shown) which reverses the polarity of the motor each time the machine is stopped so that the brushes, although counter-rotating, are reversed in their rotating direction each time the machine is started.

FIGURES 14a, 14b and 14c are sections taken at a—a, b—b and c—c of FIGURE 14 to show the path 416 taken by the zipper chain and the means for reversing the chain so that its side and end surfaces are brushed before it is wound onto the spool 6.

In FIGURE 14a it is shown that the chain enters the path 416 from the tension puller 410 with the tape of the chain beneath a tie plate 502 secured in a block 504 while the element of the chain is seated in a groove 506 of a block 508. It will also be noted that the surface of the element is disposed above the plane of both the block 508 and the plate 502. After leaving the block 508 at 416a (FIGURE 14) the chain then enters that portion of the run shown in FIGURE 14b in which the outer terminal end of the element of the chain is disposed slightly above the plane of two adjacent blocks 510 with the remainder of the element seated in a groove 512 formed by the blocks 510 and it will be noted that the tape extends downwardly into a further groove 514. The chain is then turned over onto its side by a plate 516 (FIGURE 14) to enter the final brushing stage which is substantially a reversal of the stage shown in FIGURE 14a. In FIGURE 14c it is seen that a groove 506a retains the element of the zipper chain with one side surface thereof extending above the plane of a block 508a and a tie plate 502a. After the chain leaves the section shown in FIGURE 14c it then proceeds into the nip of the rollers 450 and 452 shown in FIGURE 13 and then proceeds to the winding spool 6.

It will be appreciated that, due to the various positions taken by the zipper chain and tape during its run through the passage 416 and due also to the location of the brushing members 470, the elements of the chain will be brushed on both sides as well as the end face and, in addition, each side will be brushed both ways, i.e. on the side leading into the brushing section as well as the side leading out of the brushing section due to the fact that every second brush of the mechanism is rotating counterclockwise with respect to the preceding brush.

Figure 16:
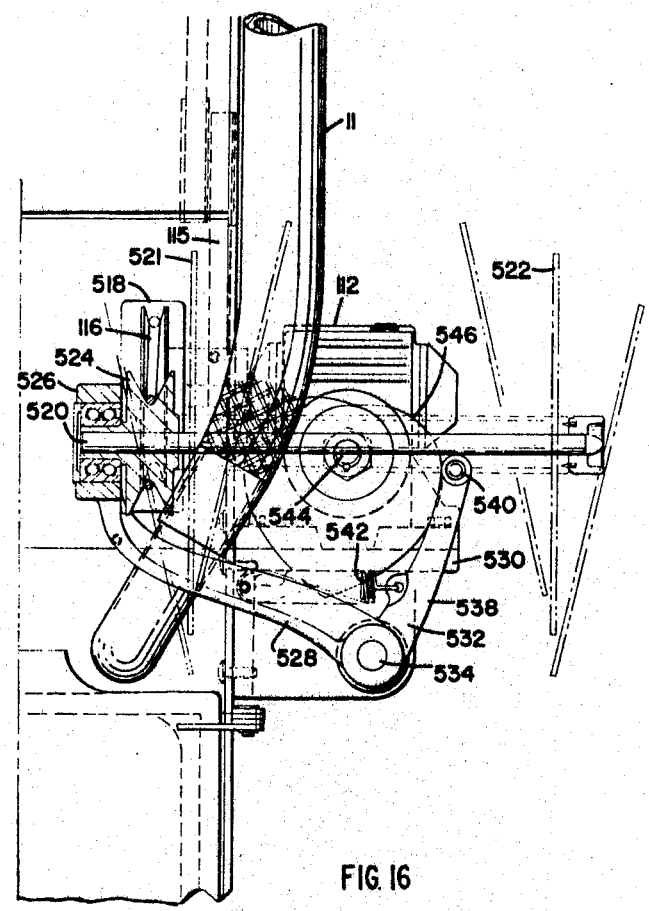
FIGURE 16 is an end elevation of the spool and its associated winding mechanism shown in side elevation in FIGURE 2.

As shown in FIGURES 2 and 16, the winding spool is generally indicated at 6 and is mounted on one end of the cabinet of the complete apparatus. The gear box 112 is driven by the pulley 114 through the action of a belt 115 circulated by the pulley 110. See FIGURE 2. The gear box is provided with an output pulley 518 which rotates the winding spool 6 through the wire belt 116.

Winding spool 6 comprises a shaft 520 having a pair of end plates 521, 522 and a pulley 524 driven by the belt 116. Pulley 524 is mounted for rotation in bearings 526 provided in one end of a lever arm 528.

The gear box 112 is mounted on a plate 530, the latter having a pair of depending leg plates 532. The other end of lever arm 528 which supports the pulley 524 curves about in the manner shown in FIGURE 16 and terminates in a shaft 534 rotatably mounted in the leg plates 532 in bearings 536. Integrally formed with the lever 528 on shaft 532 is a cam follower arm 538 provided on its terminal end with a follower 540. Intermediate its two ends, the follower arm 538 is provided with a spring 542 which interconnects the arm with the side plate of the apparatus.

Gear box 112 also includes an output shaft 544 on which is mounted in a heart-shaped cam 546. Due to the integral arrangement of the follower arm 538 and lever arm 528, rotation of the cam 546 causes the follower 540 and its arm 538 to oscillate backwards and forwards and to impart the same movement to the arm 528 and pulley shaft 520. This has the effect of rocking the pulley 6 backwards and forwards to the pecked line positions to evenly wind the zipper chain as it leaves the nip of the drive pulley at the end of the brushing section as shown in FIGURE 2.

It will be appreciated that the described apparatus provides a complete zipper manufacturing apparatus from the stage of wire and tape right through to the finished brushed and wound product. On the other hand, the four separate stages of the apparatus, zipper maker; chamfering device; brushing device; and spool winder, are all adaptable to fit on to or in company with existing zipper making machines.

I claim:

1. Apparatus for manufacturing zipper chain comprising a first section for receiving wire and tape therein and including a die set for forming chain elements from said wire and securing the latter onto said tape; a second section including a pair of cooperating rotatable members adapted to receive said zipper chain therebetween for sizing and chamfering each chain element; a third section including means for brushing exposed surfaces of said chain elements; and a fourth section comprising means for spool winding the finished zipper chain for storage and shipping.

2. Apparatus according to claim 1 including drive means comprising a motor, a gear box and a lay shaft having a plurality of pulleys thereon;

(a) a first pulley on said motor connected to said first section by belt transmission;

(b) an input shaft and pulley therefor on said gear box and a second pulley on said motor connected to said input pulley by variable ratio transmission;

(c) an output shaft on said gear box including a sprocket and pulley, said sprocket being interconnected to said second section by a drive chain and said pulley being connected to, and adapted to rotate, a lay shaft by means of further variable ratio transmission;

(d) a first pulley on said lay shaft for operating said third section by a drive belt; and a second lay shaft pulley for operating said spool winding means.

3. Apparatus according to claim 2 including means for varying the ratio and inhibiting slack in the drive between (a) said motor and gear box and (b) said gear box and lay shaft whereby tension on the zipper chain is substantially constant.

4. Apparatus according to claim 3 wherein said ratio varying means comprises a first idler pulley on the transmission between said motor and gear box; a tension arm responsive to the zipper chain pivotally mounted to one end of an arm on said apparatus and said first idler being mounted for rotation on the other end of said arm; said tension arm supporting said chain between the first and second sections whereby tension changes are transmitted to said gear box and second section; a second tension arm supporting the chain between said second and third section, an arm pivotally supporting, at one end, said second tension arm, and a second idler pulley rotatably mounted on the other end of said arm and acting on the drive between said gear box and lay shaft whereby rotation of the latter and its pulleys are responsive to said chain tension intermediate said second and third sections.

5. Apparatus according to claim 4 including limit switches mounted on said apparatus responsive to said first and second tension arms whereby, if tension of the chain between said sections substantially increases, said limit will be actuated by said arms to shut off said motor.

6. Apparatus according to claim 1 including vacuum means associated with the third section for removing waste from said section; and a blower for cooling said first section.

7. A device for forming zipper chain comprising a body; means for feeding wire and tape into said body from supply sources; a die and ram set mounted for cooperative operation in said body; an eccentric driving shaft for actuating said ram with respect to the die; means interconnecting the driving shaft with the wire and tape feeding means to apply incremental movement thereto; and means for intermittently interrupting the application of wire onto said tape during continuous running of the latter.

References Cited

UNITED STATES PATENTS

| 2,244,667 | 6/1941 | Banning | 29—207.5 |
| 2,261,552 | 11/1941 | Koppel | 29—207.5 |

FOREIGN PATENTS

| 661,442 | 4/1963 | Canada. |

THOMAS H. EAGER, Primary Examiner

U.S. Cl. X.R.

29—208